(12) United States Patent
Cai

(10) Patent No.: US 10,017,297 B2
(45) Date of Patent: Jul. 10, 2018

(54) DEGRADABLE BEARING PALLET AND PREPARATION METHOD THEREOF

(71) Applicant: Dongguan Big Green Environmental Protection Technology Co., Ltd., Dong Guan (CN)

(72) Inventor: Ronghua Cai, Dong Guan (CN)

(*) Notice: Subject to any disclaimer, the term of this patent is extended or adjusted under 35 U.S.C. 154(b) by 0 days.

(21) Appl. No.: 15/409,553

(22) Filed: Jan. 19, 2017

(65) Prior Publication Data

US 2018/0072457 A1    Mar. 15, 2018

(30) Foreign Application Priority Data

Sep. 12, 2016 (CN) .......................... 2016 1 0816933

(51) Int. Cl.
| | |
|---|---|
| *B65D 19/00* | (2006.01) |
| *B65D 19/44* | (2006.01) |
| *C08G 18/48* | (2006.01) |
| *C08G 18/76* | (2006.01) |
| *C08G 18/20* | (2006.01) |
| *C08G 18/18* | (2006.01) |

(52) U.S. Cl.
CPC ......... *B65D 19/44* (2013.01); *B65D 19/0081* (2013.01); *C08G 18/1875* (2013.01); *C08G 18/2036* (2013.01); *C08G 18/4804* (2013.01); *C08G 18/7671* (2013.01); *B65D 2519/00084* (2013.01); *B65D 2519/00208* (2013.01); *B65D 2519/00273* (2013.01); *B65D 2519/00293* (2013.01); *B65D 2519/00318* (2013.01); *B65D 2519/00815* (2013.01); *C08G 2230/00* (2013.01)

(58) Field of Classification Search
CPC ............... B65D 19/44; B65D 19/0008; B65D 19/0028; B65D 19/06; B65D 19/18; B65D 19/38; B65D 19/40
See application file for complete search history.

(56) References Cited

U.S. PATENT DOCUMENTS

| | | | | |
|---|---|---|---|---|
| 6,955,129 | B2* | 10/2005 | Moore, Jr. ......... | B65D 19/0012 108/57.25 |
| 2001/0029874 | A1* | 10/2001 | Muirhead .......... | B65D 19/0012 108/57.25 |
| 2008/0210140 | A1* | 9/2008 | Valentinsson ...... | B65D 19/0014 108/57.25 |
| 2011/0259249 | A1* | 10/2011 | Ogburn ............. | B65D 19/0038 108/57.33 |

* cited by examiner

*Primary Examiner* — Daniel J Rohrhoff
(74) *Attorney, Agent, or Firm* — Prakash Nama; Global IP Services, PLLC

(57) ABSTRACT

A degradable bearing pallet and a preparation method thereof. The pallet has an upper cover, a packing middle layer and a lower cover; a plurality of pallet support legs are disposed at the bottom of the lower cover; the lower cover is integrally molded with the plurality of pallet support legs; and the packing middle layer is filled in the lower cover and in the plurality of pallet support legs; the upper cover covers the packing middle layer and the lower cover. The middle part of the bottom of each of the pallet support legs is formed with a sunken groove; the pallet support legs in each of the rows are mutually connected through a connecting board; and each of the connecting boards is clamped in a corresponding one of the sunken grooves.

7 Claims, 4 Drawing Sheets

DEGRADABLE BEARING PALLET AND PREPARATION METHOD THEREOF

BACKGROUND OF THE INVENTION

The present invention relates to the bearing pallet technologies for aviation transport, in particular to a degradable bearing pallet and a preparation method thereof.

In the prior art, pallets have included wooden pallets, iron pallets, inspection-free pallets, sterilized pallets, fumigation-free pallets, plastic pallets and chrome-plated pallets, etc. Pallets have a transport function and are more and more applied to aviation transport. During the design and manufacturing processes of pallets applicable to assembling tool racks of airplane products, it is usually found that many stations are large in dimensions and identical or similar in shape and have identical or similar elements. In the prior art, all stations are provided with pallets; the pallets are provided with the working elements (positioner, compressor, etc.); the pallets need to be lifted; and sometimes, pallet shelves need to be designed and manufactured. The pallets of such structure are inconvenient in use, have safety hazards during lifting, occupy a large factory space during storage, and therefore have very high cost.

For example, a patent, with an application No. of 201510076439.7, discloses a foaming pallet and a manufacturing method. Pallet legs are made of brown paper or PVC material housed PU hard-foam materials through foam molding. The PU hard-foam materials of the pallet legs extend upward and out of the reserved connection bodies for being connected with the pallet body. The pallet body formed by wrapping the PU hard-foam material with the brown paper encloses the reserved connection bodies at the pallet legs, and the entire body is foamed and molded to form the foam pallet with pallet legs. The reserved connection bodies at the pallet legs have reserved hooks. Each reserved connection body includes two parts, respectively a boss positioned at the top of each of the pallet legs and a reserved hook positioned at a lateral part of each of the pallet legs. The boss is provided with a ring-shaped slot. However, the pallet legs and the pallet body used in this application are separated, and after being used for a long time, are easily broken, affecting the service life. Besides, the pallet is heavy in weight. Persons with aviation transport experience all know that the heavier the cargo is, the higher the charge is. Therefore, reducing the weight of the cargo will greatly save the transport cost for enterprises.

Besides, the pallets in the prior art are difficulty to degrade, causing serious environmental pollution and high recycling cost.

BRIEF SUMMARY OF THE INVENTION

The objective of the present invention is to provide a degradable bearing pallet and a preparation method thereof to overcome defects of the prior art. The degradable bearing pallet has a light weight and a high bearing capability, is anti-skid, and wear resistant, easily naturally degraded and recyclable.

To achieve the above objective, the present invention employs the following technical solution:

A degradable bearing pallet includes an upper cover, a packing middle layer and a lower cover. A plurality of pallet support legs are disposed at the bottom of the lower cover. The lower cover is integrally molded with the plurality of pallet support legs. The packing middle layer is filled in the lower cover and in the plurality of pallet support legs. The upper cover covers the packing middle layer and the lower cover. The section of each of the pallet support legs is shaped as a reverse trapezoid.

In a preferable embodiment of the present invention, the lower cover of the present invention is separately provided with at least three rows of pallet support legs; at least three pallet support legs are arrayed in each of the rows; the middle part of the bottom of each of the pallet support legs is formed with a sunken groove; the pallet support legs in each of the rows are mutually connected through a connecting board; and each of the connecting boards is clamped in a corresponding one of the sunken grooves.

In a preferable embodiment of the present invention, the outer surface of each of the connecting boards of the present invention is provided with anti-skid wave-like patterns.

In a preferable embodiment of the present invention, the section of each of the pallet support legs of the present invention is shaped as a reverse trapezoid; the length of one end of the reverse trapezoid close to the bottom of the lower cover is greater than the length of the other end away from the bottom of the lower cover; and the inclination angle of the reverse trapezoid is set as 30-60 DEG.

In a preferable embodiment of the present invention, the upper cover and the lower cover of the present invention are made of PET materials.

In a preferable embodiment of the present invention, the outer surfaces of the upper cover and the lower cover of the present invention are provided with anti-skid wave-like patterns.

In a preferable embodiment of the present invention, an IC chip is disposed between the upper cover and the packing middle layer of the present invention; the upper cover is provided with a display window; and the IC chip is embedded in the display window.

In a preferable embodiment of the present invention, the packing middle layer of the present invention is prepared by the following ingredients by mass part:

| | |
|---|---|
| polyether polyol 4110 | 0.5-0.7 parts; |
| polyether polyol 635 | 0.1-0.2 parts; |
| polyether polyol 380 | 0.03-0.05 parts; |
| bis (2-dimethylaminoethyl) ether solution | 0.0003-0.0005 parts; |
| N,N-dimethylcyclohexanamine | 0.003-0.006 parts; |
| hexahydro-1,3,5-trimethyl-1,3,5-triazine catalyst | 0.002-0.003 parts; |
| C18 quaternary ammonium salt catalyst | 0.008-0.01 parts; |
| DBU quaternary ammonium salt catalyst | 0.00008-0.0001 parts; |
| silicone oil | 0.016-0.018 parts; |
| cyclopentane | 0.116-0.120 parts; |
| PAPI (polyaryl polymethylene isocyanate) | 1.3-1.4 parts. |

In a preferable embodiment of the present invention, the concentration of the bis (2-dimethylaminoethyl) ether solution of the present invention is 60-80% by mass.

The present invention also discloses a method for preparing the degradable bearing pallet, including the following steps:

S1. making a mold for integrally molding the lower cover and the plurality of pallet support legs, and using the PET materials to make the lower cover of the pallet;

S2. making a mold of the upper cover, using the PET materials to make the upper cover of the pallet;

S3: making the material of the packing middle layer, weighing all ingredients by mass part, mixing the ingredients, and stirring the ingredients uniformly;

S4. placing the lower cover on a horizontal workbench, uniformly injecting the material which is uniformly mixed in step S3 into the lower cover, wherein during injection, the materials are injected into each of the pallet support legs first and then into the lower cover, and the injection is stopped when the material levels the lower cover;

S5. after the packing middle layer is molded, fastening the upper cover to the lower cover.

In a preferable embodiment of the present invention, the upper cover and the lower cover of the present invention are fixed through splicing.

Compared with the prior art, the present invention has the following beneficial effects: the upper cover, the packing middle layer and the lower cover are provided; the plurality of pallet support legs which are integrally molded with the lower cover are disposed at the bottom of the lower cover; the packing middle layer is filled in the lower cover and the plurality of the pallet support legs. By setting the integrally molded structure, the stability and the bearing capability are enhanced, and sudden breakage or looseness caused by a large external force is avoided. The section of each of the pallet support legs is shaped as a reverse trapezoid at an angle of 30-60 DEG. In the terms of engineering mechanics, a light weight can be obtained, and heavy articles can be carried. Connecting boards are disposed between the pallet support legs, capable of enhancing the bearing capability, preventing breakage and prolonging service life. The material of the packing middle layer is an environmentally-friendly material, with a strong support capability, capable of strengthening the product roughness, surface rigidity and breakage resistance. The whole product is only 2.8-3 KG in weight, and has a bearing capability of 1,000-3,600 kg. The weight of the pallet of the present invention is ½-¼ of that of a wooden pallet. With a light weight, the pallet of the present invention has the largest bearing capability in terms of the same weight at present, which is particularly applicable to aviation transport, saves cost and enhances the bearing capability. The packing middle layer is made of an environmentally-friendly material, and the upper cover and the lower cover are made of PET materials, which are all environmentally-friendly materials capable of being naturally degraded and recycled, avoiding environmental pollution. The materials can be directly buried if not used, and can be completely degraded after about one year. Connecting boards are disposed between the support legs, increasing the stability; and the IC chip is provided, which has a memory function, so the position information of the pallet can be scanned and tracked at any time.

DETAILED DESCRIPTION OF THE INVENTION

The objective of the present invention is to provide a degradable bearing pallet and a preparation method thereof to overcome defects of the prior art. The degradable bearing pallet has a high bearing capability and a light weight, is unbreakable, capable of performing automatic degradation, and particularly applicable to aviation transport. The present invention is described in detail below in conjunction with the embodiments and with reference to the attached drawings to better explain the technical characteristics and advantages of the present invention.

Figure 1:
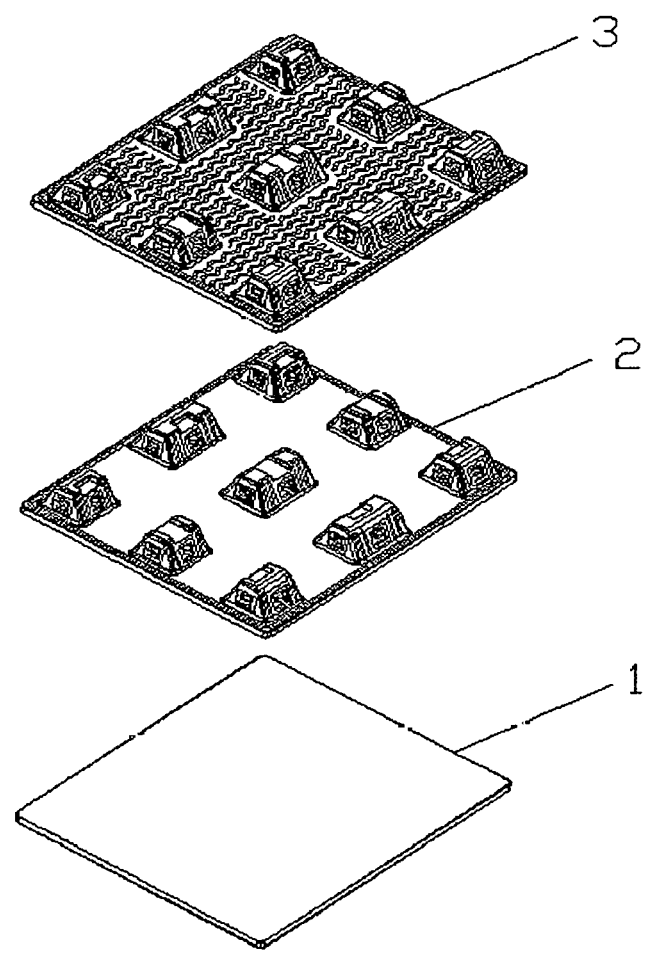
FIG. 1 is an exploded view of the overall structure of the present invention.
Figure 2:
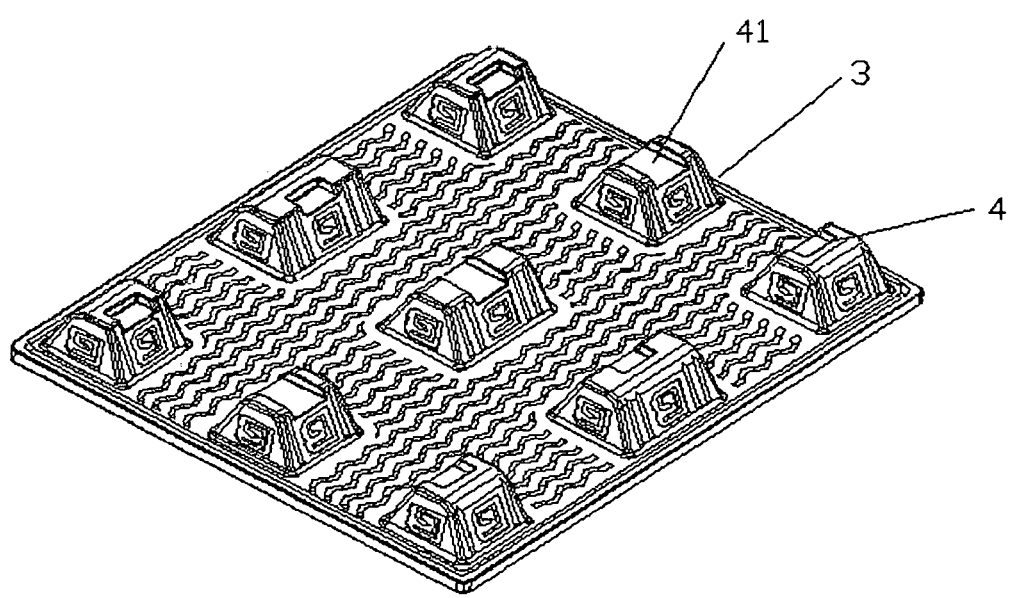
FIG. 2 is a structural view of a lower cover of the present invention.

The schematic views of the overall structure of the present invention can be seen in FIGS. 1-2. A degradable bearing pallet includes an upper cover 1, a packing middle layer 2 and a lower cover 3, wherein a plurality of pallet support legs 4 are disposed at the bottom of the lower cover 3; the lower cover 3 is integrally molded with the plurality of pallet support legs 4; the packing middle layer 2 is filled in the lower cover 3 and in the plurality of pallet support legs 4; the upper cover 1 covers the packing middle layer 2 and the lower cover 3; and the section of each of the pallet support legs 4 is shaped as a reverse trapezoid. For traditionally structured pallets, the pallet support legs and pallet body are usually separated, independently processed and then combined for use. However, during aviation transport, multiple fractures or breakages are easily caused during use. In the invention, the lower cover 3 and the plurality of pallet support legs 4 are integrally molded, and the packing middle layer 2 is filled in the lower cover 3 and the plurality of pallet support legs 4, so that the support legs and the main body are integrally molded in a filled way, avoiding breakage. Besides, the integrally molded structure strengthens the stability and bearing strength, avoiding sudden breakage or looseness caused by a large external force.

In the present invention, the section of each of the pallet support legs 4 is shaped as a reverse trapezoid; the length of one end of the reverse trapezoid close to the lower cover 3 is greater than the length of the other end away from the bottom of the lower cover 3; and the inclination angle of the reverse trapezoid is set as 30-60 DEG. Different from other prior arts, the inclination angle of the reverse trapezoid of the present invention is set as 30-60 DEG. In the terms of engineering mechanics, a light weight can be obtained, and heavy articles can be carried. For example, the inclination angle can be set as 30 DEG, 45 DEG or 60 DEG. The object bearing capability varies with the inclination angle. The inclination angle can be set upon materials and demands.

Figure 3:
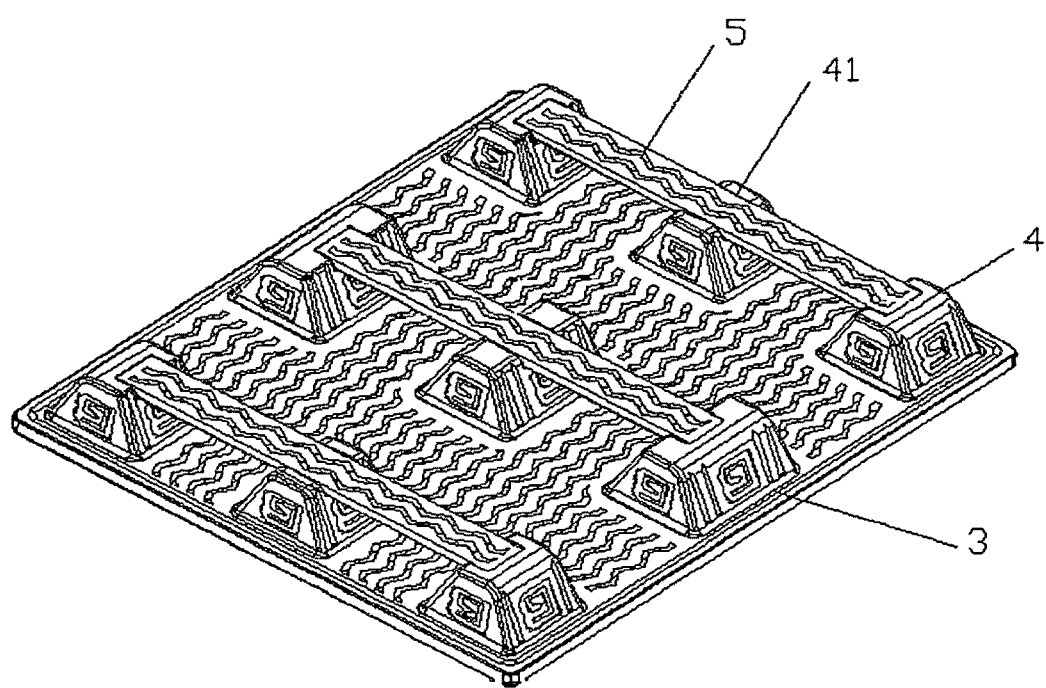
FIG. 3 is a structural view of the lower cover provided with a connecting board of the present invention.

As shown in the FIGS. 2 and 3, in the present invention, the lower cover 3 is separately provided with at least three rows of pallet support legs 4; at least three pallet support legs 4 are arrayed in each of the rows; the middle part of the bottom of each of the pallet support legs 4 is formed with a sunken groove 41; the pallet support legs 4 in each of the rows are mutually connected through a connecting board 5; and each of the connecting boards 5 is clamped in a corresponding one of the sunken grooves 41. A non-return portion is disposed at the sunken groove 41 which clamps the two ends of each of the connecting boards 5, which means that half is shaped as the sunken groove and the other half is configured to be leveled with the bottom. In this way, each of the connecting boards 5 can be more stably clamped in the corresponding sunken grooves 41 to connect the corresponding pallet support legs 4, enhancing the bearing capability. During use of the pallet, relative slipping of articles and the pallets usually occur. The outer surfaces of the connecting boards 5 of the present invention are provided with anti-skid wave-like patterns. In the invention, the pallet can be used in combination with the connecting board 5, or can be used independently without the connecting boards 5.

At present, along with the development of the aviation transport, more and more pallets are demanded. As the pallets develop, old pallets must be recycled and degraded to avoid environmental pollution. The upper cover 1 and the lower cover 3 of the present invention are made of PET materials (polyethylene terephthalate). The upper cover 1 and the lower cover 3 are made of PET materials, so the recycled pallets can be buried and automatically degraded. The outer surfaces of the upper cover 1 and the lower cover 3 of the present invention are provided with anti-skid wave-like patterns, increasing the friction forces between the pallets and the articles. Of course, the invention is not limited to the PET materials, and can also adopt PVC materials.

Figure 4:
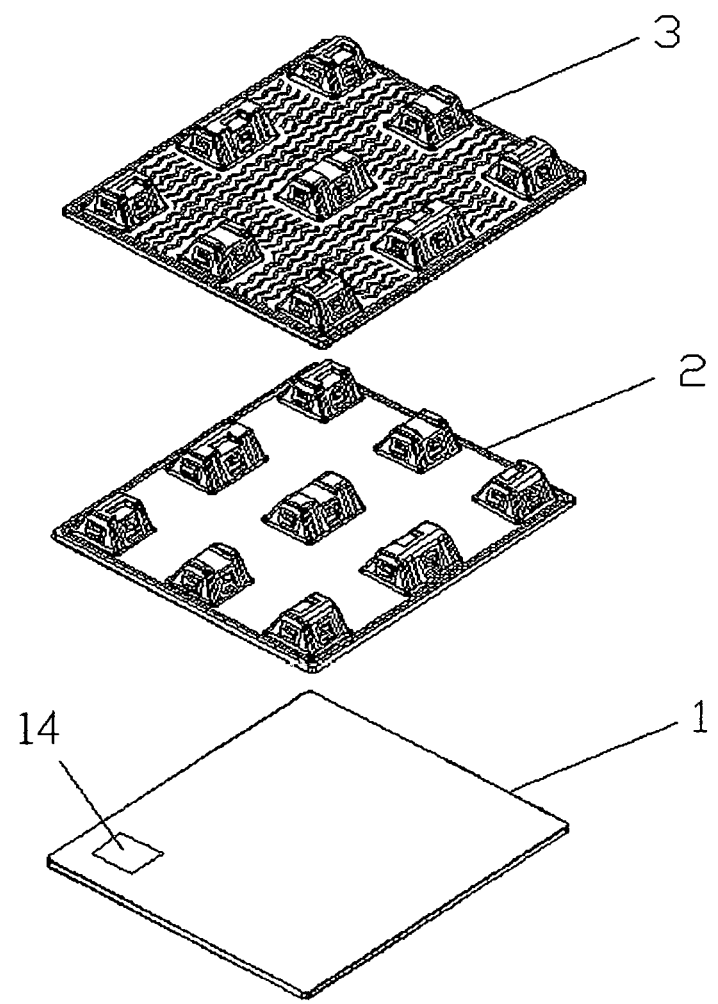
FIG. 4 is a structural view of the settings of an IC chip of the invention.

As shown in FIG. 4, in the invention, an IC chip 14 is disposed between the upper cover 1 and the packing middle layer 2; the upper cover 1 is provided with a display window; the IC chip 14 is embedded in the display window; the IC chip is a memory chip, having memorizing and tracking functions. By scanning the IC chip, the position of a pallet can be memorized and tracked. Of course, the IC chip of the invention can also be disposed on a lateral side of the upper cover 1, and logistics information can be obtained by scanning with a scanning gun. The scanning gun obtains the logistics information to get a connection with the Internet, so users can master the dynamic status of the pallet in time.

In order to ensure that materials adopted by the present invention are completely automatically degraded, the packing middle layer of the present invention is prepared by the following ingredients by mass part. Below are several embodiments.

Embodiment 1

| | |
|---|---|
| polyether polyol 4110 | 0.5 parts; |
| polyether polyol 635 | 0.1 parts; |
| polyether polyol 380 | 0.03 parts; |
| bis (2-dimethylaminoethyl) ether solution | 0.0003 parts; |
| N,N-dimethylcyclohexanamine | 0.003 parts; |
| hexahydro-1,3,5-trimethyl-1,3,5-triazine catalyst | 0.002 parts; |
| C18 quaternary ammonium salt catalyst | 0.008 parts; |
| DBU quaternary ammonium salt catalyst | 0.00008 parts; |
| silicone oil | 0.016 parts; |
| cyclopentane | 0.116 parts; |
| PAPI (polyaryl polymethylene isocyanate) | 1.3 parts. |

In the above embodiment, polyether polyol, which is called polyester in short, is prepared by a polyaddition reaction of low polymers of which the main chains contain ether bonds (—R—O—R—) and of which the terminal groups or pendent groups contain more than 2 hydroxide radicals (—OH), an initiator (a compound containing active hydrogen radicals), ethylene oxide (EO), propylene oxide (PO), butane oxide (BO) with the existence of catalysts. The maximum yield of the polyether is obtained by using glycerol as the initiator and the epoxide. By changing conditions such as the feeding mode (mixed or separate way) of PO and EO, the amount ratio and the feeding sequence, various universal polyether polyols are produced.

The polyether polyol 4110 has an average functionality degree of 4.0-5.0 and a hydroxyl value of 430-470 mgKOH/g; the polyether polyol 635 has an average functionality degree of 3.5-4.2 and a hydroxyl value of 470-490 mgKOH/g; and the polyether polyol 380 has an average functionality degree of 3.4-3.8 and a hydroxyl value of 380-420 mgKOH/g. For example, in embodiment 1, the polyether polyol 4110 has a functionality degree of 4.0 and a hydroxyl value of 430 mgKOH/g; the polyether polyol 635 has a functionality degree of 3.5 and a hydroxyl value of 470 mgKOH/g; and the polyether polyol 380 has a functionality degree of 3.4 and a hydroxyl value of 380 mgKOH/g.

The polyether polyol 4110 is synthesized with saccharose, propylene glycol and epoxypropane, taking the saccharose as the initiator. The polyether polyol 635 takes sorbitol as the initiator. The polyether polyol 635 and the polyether polyol 4110 are hard-foam polyether, which are usually polyoxypropylene tetraol or hexaol, taking tetramethylolmethane, dene diamine, sugar and sorbitol as the initiator, having a relatively high degree of functionality and having reaction activities far higher than those of the flexible-foam polyether. Rigid polyurethane foams are massively applicable to the temperature preservation of home appliances, outer building walls, and large-sized refrigeration storages. A huge amount of rigid polyurethane foams are needed. The production of such polyether is relatively simple; diversified polyether of different quality are available on the domestic market, a little bit lower than the flexible-foam polyether in price Domestic manufacturers of flexible-foam and hard-foam polyether are relatively concentrated because the main material sources, propylene oxide and ethylene oxide, mainly come from Shandong province or are mainly imported. Main manufacturers include: Sinopec Shanghai Gaoqiao Petrochemical Co., Ltd., GPRO Group Jiangsu Zhongshan Chemical Co., Ltd., Shandong Dongda Group Co., Ltd., Shandong Sinder Federal Corporation, Third Petrochemical Factory of Tianjin Petrochemical Co., Ltd., Fushun Jiahua Chemicals Inc., CNOOC and Shell petrochemical company limited, Nanjin HUMHO Tire, etc. Polyether polyol 380 (polyether polyol SA-380) is highactivity polyether which has high reaction activities, for example, the polyether polyol 380 produced in Langfang, Hebei province. The polyether polyol 4110, polyether polyol 635 and polyether polyol 380 used in the present invention were products supplied by Liyang Chemical Factory.

Cyclopentane is used as a solvent, a foaming agent (replacing Freon) for preparation of the polyurethane foam, and a standard substance for chromatographic analysis, etc. The cyclopentane is a pure product with a concentration of 99.9-100%. PAPI (polyaryl polymethylene isocyanate) or crude MDI, is a viscose liquid which is light yellow to brown. PAPI smells like an irritant, and is used during the pallet preparation to improve the viscosity of all ingredients of the pallets. PAPI is required to be kept in a cool, ventilated and dry warehouse, away from fire and heat sources. Water, moisture and light exposure are strictly prohibited. The relative density of PAPI (20° C./20 DEGC) is 1.2. The ignition temperature is 218 DEGC. The freezing point is smaller than 10 DEGC, and the viscosity (25 DEGC) is 200-1,000 mPa·s, for example, the viscosity (25 DEGC) is 200 mPa·s in this embodiment. PAPI is a mixture of MDI and polyisocyanates with more than two functional groups in a ratio of 1:1. PAPI is low in steam pressure, in volatility and in cost, so using PAPI as the raw material is environmentally-friendly and healthy and reduces raw material costs.

The bis (2-dimethylaminoethyl) ether solution is 70% bis (2-dimethylaminoethyl) ether solution. The catalyst prepared by 70 mass % bis (2-dimethylaminoethyl) ether solution and 30 mass % dipropylene glycol (DPG) is most frequently used. N,N-dimethylcyclohexanamine (Nitrogen, Nitrogen-dimethylcyclohexanamine) is a transparent liquid which is colorless to light yellow, capable of being dissolved in alcohol and ether solvents. It is mainly used as a hardfoam polyurethane catalyst. The hexahydro-1,3,5-trimethyl-1,3,5-triazine catalyst is hexahydro-1,3,5-tris(hydroxyethyl)-s-triazine, which is a light yellow transparent viscose liquid and has a content of 74.00-78.00%. The C18 quaternary ammonium salt catalyst is 2,4,6-tris(dimethylaminomethyl)phenol, or the salt solution of C18 quaternary ammonium salt, with a concentration of 60-80%. The DBU quaternary ammonium salt catalyst is 1,8-diazabicycloundec-7-ene, or the salt solution of DBU quaternary ammonium salt, with a concentration of 60-80%. The bis (2-dimethylaminoethyl) ether solution, N,N-dimethylcyclohexanamine, hexahydro-1,3,5-trimethyl-1,3,5-triazine catalyst, C18 quaternary ammonium salt catalyst and DBU quaternary ammonium salt catalyst are all polyurethane catalysts with a delay action, all produced by Liyang Chemical Factory. When those catalysts are supplied in the form of salt solutions, the mass ratio is 60-80%. For example, in the embodiment, the concentration in the mass ratio of the above salt solutions can be 60%. The above catalysts balance the foaming and gelling reactions to achieve an ideal foaming effect, so that the whole pallet has a high bearing capability and high air permeability.

The silicone oil is annular polydimethylsiloxane which is obtained by steps of preparing the primarily polycondensed annulus through hydrolysis of dimethyldichlorosilane, cracking and refining the annulus to obtain low annulus, gathering the annulus, the 1,1,3,3-Tetramethyldisiloxane and the catalyst and then performing telomerization to obtain mixtures of different polymerization degrees, decompressing and distilling the mixtures to remove the low-boiling-point substances. The viscosity of the silicone oil is 100-200 (25 DEGC)cs. The KS6840 silicone oil is a surfactant supplied by Nanjing KISEN International Engineering Co., Ltd., for example, the viscosity of the silicone oil is 100 (25 DEGC) cs.

Embodiment 2

| | |
|---|---|
| polyether polyol 4110 | 0.6 parts; |
| polyether polyol 635 | 0.15 parts; |
| polyether polyol 380 | 0.04 parts; |
| bis (2-dimethylaminoethyl) ether solution | 0.0004 parts; |
| N,N-dimethylcyclohexanamine | 0.0045 parts; |
| hexahydro-1,3,5-trimethyl-1,3,5-triazine catalyst | 0.0025 parts; |
| C18 quaternary ammonium salt catalyst | 0.009 parts; |
| DBU quaternary ammonium salt catalyst | 0.00009 parts; |
| silicone oil | 0.017 parts; |
| cyclopentane | 0.118 parts; |
| PAPI (polyaryl polymethylene isocyanate) | 1.35 parts. |

The bis (2-dimethylaminoethyl) ether solution, N,N-dimethylcyclohexanamine, hexahydro-1,3,5-trimethyl-1,3,5-triazine catalyst, C18 quaternary ammonium salt catalyst and DBU quaternary ammonium salt catalyst are all polyurethane catalysts with a delay action, and all produced by Liyang Chemical Factory. When those catalysts are supplied in the form of salt solutions, the mass ratio is 70%.

The polyether polyol 4110 has a functionality degree of 4.5 and a hydroxyl value of 450 mgKOH/g; the polyether polyol 635 has a functionality degree of 3.9 and a hydroxyl value of 480 mgKOH/g; the polyether polyol 380 has an average functionality degree of 3.6 and a hydroxyl value of 400 mgKOH/g, for example, the viscosity of the silicone oil is 150 (25 DEGC)cs, and PAPI viscosity (25 DEGC) is 600 mPa·s.

Embodiment 3

| | |
|---|---|
| polyether polyol 4110 | 0.7 parts; |
| polyether polyol 635 | 0.2 parts; |
| polyether polyol 380 | 0.05 parts; |
| bis (2-dimethylaminoethyl) ether solution | 0.0005 parts; |
| N,N-dimethylcyclohexanamine | 0.006 parts; |
| hexahydro-1,3,5-trimethyl-1,3,5-triazine catalyst | 0.003 parts; |
| C18 quaternary ammonium salt catalyst | 0.01 parts; |
| DBU quaternary ammonium salt catalyst | 0.0001 parts; |
| silicone oil | 0.018 parts; |
| cyclopentane | 0.120 parts; |
| PAPI (polyaryl polymethylene isocyanate) | 1.4 parts. |

The bis (2-dimethylaminoethyl) ether solution, N,N-dimethylcyclohexanamine, hexahydro-1,3,5-trimethyl-1,3,5-triazine catalyst, C18 quaternary ammonium salt catalyst and DBU quaternary ammonium salt catalyst are all polyurethane catalysts with a delay action, and all produced by Liyang Chemical Factory. When those catalysts are supplied in the form of salt solutions, the mass ratio is 80%.

The polyether polyol 4110 has an average functionality degree of 5.0 and a hydroxyl value of 470 mgKOH/g; the polyether polyol 635 has an average functionality degree of 4.2 and a hydroxyl value of 490 mgKOH/g; the polyether polyol 380 has an average functionality degree of 3.8 and a hydroxyl value of 420 mgKOH/g, for example, the viscosity of the silicone oil is 200 (25 DEGC)cs, and PAPI viscosity (25 DEGC) is 1,000 mPa·s.

The produced packing middle layers 2 in the embodiments are only 2.8-3 KG weight, and have bearing capabilities of 1,000-3,000 KG. The weight of the pallet of the present invention is ½-¼ of that of a wooden pallet. The pallet of the present invention is light in weight and particularly applicable of aviation transport, saves cost, enhances the bearing capability, and is environmentally-friendly material capable of being naturally degraded.

The present invention also discloses a method for preparing the degradable bearing pallet, including the following steps.

S1. Making a mold for integrally molding the lower cover 3 and the plurality of pallet support legs 4, and using the PET materials to make the lower cover 3 of the pallet. In the invention, the mold for integrally molding the lower cover 3 and the plurality of the pallet support legs 4 are manufactured first. The mold includes an upper die and a lower die. By injecting the PET materials between the upper die and the lower die, the lower cover 3 and the plurality of the pallet support legs 4 are molded by injection at one time. For example, in FIG. 1, nine pallet support legs 4 are divided into three rows; the three pallet support legs 4 in the longitudinal row are provided with sunken grooves 41, and the pallet support legs 4 on two sides are provided with the non-return portions, thus facilitating clamping of the connecting boards 5.

S2. Making a mold of the upper cover 1, using the PET materials to make the upper cover 1 of the pallet. The mold of the upper cover 1 is made. The mold includes an upper die and a lower die. By injecting the PET material between the upper die and the lower die, the upper cover 1 is molded by injection at one time.

S3. Making the material of the packing middle layer 2. All ingredients are weighed, mixed and blended by mass part; the mixture is poured into the foaming mold; the mixture is cured at room temperature. The ingredients of the packing middle layer 2 are mixed uniformly and prepared into the packing material to be filled in.

S4. Placing the lower cover 3 on a horizontal workbench, uniformly injecting the material which is uniformly mixed in step S3 into the lower cover 3, wherein during injection, the materials are injected into each of the pallet support legs 4 first, and then into the lower cover 3, and the injection is stopped when the material levels the lower cover 3. According to the present invention, the packing middle layer 2 can be independently manufactured, and at the completion, the upper cover 1 and the lower cover 3 are installed. For example, the mold of the packing middle layer 2 is provided; the mold includes an upper die and a lower die; and the material which is obtained in step 3 by weighing the required ingredients in a mass ratio and then uniformly mixing and blending the ingredients is filled into the mold; and the material is demolded after being molded and kept for later assembling.

S5. After the packing middle layer 2 is molded, fastening the upper cover 1 to the lower cover 3. The upper cover 1 and the lower cover 3 of the present invention are fixed through splicing, for example, by two-side adhesive tape or glue.

The present invention is clearly and completely described through the technical solution in the above embodiments. Obviously, the described embodiments are only a part of the embodiments of the present invention, not all the embodiments of the present invention. Based on the embodiments in the present invention, those ordinarily skilled in this field can obtain other embodiments without creative labor, which all shall fall within the protective scope of the present invention.

What is claimed is:

1. A degradable bearing pallet, comprising an upper cover (1), a packing middle layer (2) and a lower cover (3), characterized in that a plurality of pallet support legs (4) are disposed at a bottom side of the lower cover (3); the lower cover (3) is integrally molded with the plurality of pallet support legs (4); the packing middle layer (2) is filled in the lower cover (3) and in the plurality of pallet support legs (4); the upper cover (1) covers the packing middle layer (2) and the lower cover (3); and a section of each of the pallet support legs (4) is shaped as a reverse trapezoid; the lower cover (3) is separately provided with at least three rows of the pallet support legs (4); at least three pallet support legs are arrayed in each of the rows; a middle part of a bottom side of each of the pallet support legs (4) is formed with a sunken groove (41); the pallet support legs (4) in each of the rows are mutually connected through a connecting board (5); and each of the connecting boards (5) is clamped in a corresponding one of the sunken grooves (41).

2. The degradable bearing pallet according to claim 1, characterized in that a length of one end of the reverse trapezoid close to the bottom side of the lower cover (3) is greater than a length of another end away from the bottom side of the lower cover (3); and an inclination angle of the reverse trapezoid is set as 30-60 degrees.

3. The degradable bearing pallet according to claim 2, characterized in that the upper cover (1) and the lower cover (3) are made of PET materials.

4. The degradable bearing pallet according to claim 3, characterized in that outer surfaces of the upper cover (1), the lower cover (3) and the connecting boards (5) are provided with anti-skid wave patterns.

5. The degradable bearing pallet according to claim 1, characterized in that an IC chip (14) is disposed between the upper cover (1) and the packing middle layer (2); the upper cover (1) is provided with a display window; and the IC chip (14) is embedded in the display window.

6. The degradable bearing pallet according to claim 1, characterized in that the packing middle layer is prepared by the following ingredients by mass part:

| | |
|---|---:|
| polyether polyol 4110 | 0.5-0.7 parts; |
| polyether polyol 635 | 0.1-0.2 parts; |
| polyether polyol 380 | 0.03-0.05 parts; |
| bis (2-dimethylaminoethyl) ether solution | 0.0003-0.0005 parts; |
| N,N-dimethylcyclohexanamine | 0.003-0.006 parts; |
| hexahydro-1,3,5-trimethyl-1,3,5-triazine catalyst | 0.002-0.003 parts; |
| C18 quaternary ammonium salt catalyst | 0.008-0.01 parts; |
| DBU quaternary ammonium salt catalyst | 0.00008-0.0001 parts; |
| silicone oil | 0.016-0.018 parts; |
| cyclopentane | 0.116-0.120 parts; |
| PAPI (polyaryl polymethylene isocyanate) | 1.3-1.4 parts. |

7. The degradable bearing pallet according to claim 6, characterized in that a concentration of the bis (2-dimethylaminoethyl) ether solution is 60-80% by mass.

* * * * *